July 15, 1969  G. P. BOYLE  3,455,164
IMMERSION MOLTEN METAL SAMPLER
Filed July 6, 1966  2 Sheets-Sheet 1

July 15, 1969   G. P. BOYLE   3,455,164
IMMERSION MOLTEN METAL SAMPLER
Filed July 6, 1966   2 Sheets-Sheet 2
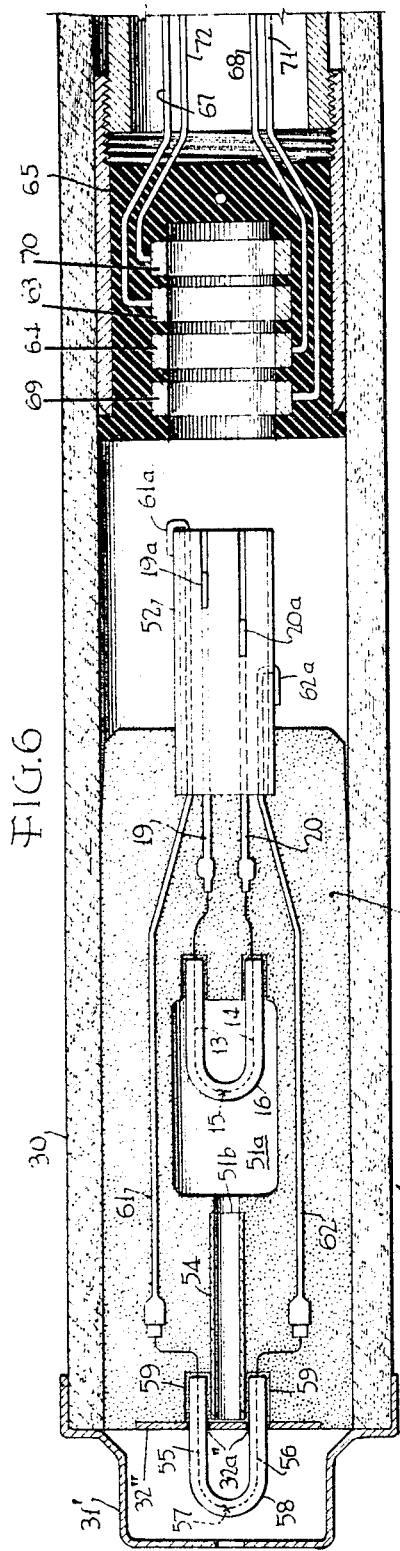
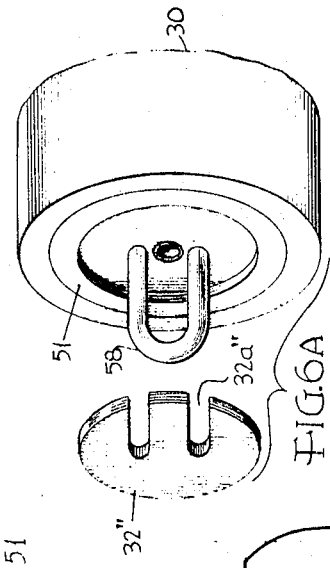
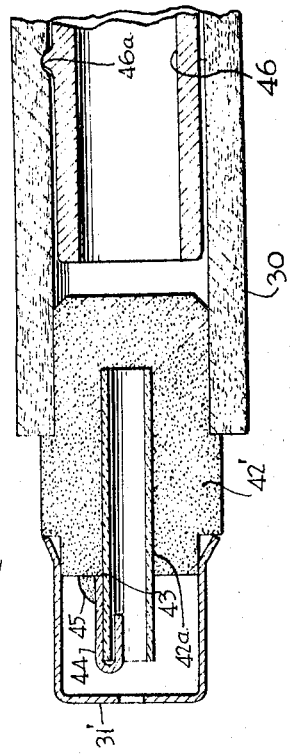
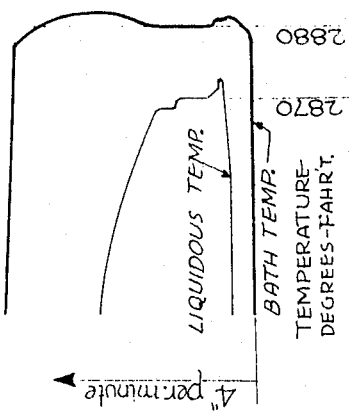

United States Patent Office 3,455,164
Patented July 15, 1969

3,455,164
IMMERSION MOLTEN METAL SAMPLER
Gerald P. Boyle, Philadelphia, Pa., assignor to Leeds & Northrup Company, Philadelphia, Pa., a corporation of Pennsylvania
Filed July 6, 1966, Ser. No. 563,108
Int. Cl. G01n 25/02
U.S. Cl. 73—354                                         24 Claims

ABSTRACT OF THE DISCLOSURE

An immersion sampler device for measuring the temperature of a sample of molten material at a subsurface level of a molten bath. This device includes an immersible body having walls defining a cavity to receive and retain a molten sample of material when immersed in a molten bath. The walls provide a heat sink to cool the sample in a manner permitting recording the changing temperature of the cooling sample to produce a curve showing a phase change temperature.

---

This invention relates to an immersion molten material sampler and has for an object the provision of an immersion device for taking a sample of molten material at a subsurface level of a bath of molten material.

In the manufacture of, for example, metals, and particularly steel, it is desirable to make various tests of the material of the molten bath before it is poured. Among these tests are included a determination of the temperature of the bath, a determination of the percentage content of carbon, hydrogen, oxygen, and nitrogen and also the determination of the presence or concentration of minor constituents in the steel. The present invention relates to an improved method of and apparatus for taking a sample of molten material at a subsurface level of a molten bath for subsequent use in chemical or spectrographic analysis. In one form, it additionally relates to determination of the phase change temperature of the material of the bath. The invention is applicable to materials whether metallic or nonmetallic, having phase change temperatures including liquidus and/or solidus. The present invention will be described with regard to steel as the molten material. The liquidus temperature can be used to determine the percentage of carbon in steel. Additionally, in still another form, the invention includes means to measure the temperature of the bath. Thus it will be seen that one of the objects of the invention is to provide for the taking of temperature measurements beneath the surface of a bath of molten material and beneath any slag which may be present while a sample is being isolated from the bath with only a single immersion being required.

In accordance with one aspect of the invention, there is provided an immersion device for taking a sample of molten material at a subsurface level of a bath of molten material comprising a body having a cavity closed at one end and open at the other end to receive the sample of molten material. A flow passage connects the open end of the cavity with the exterior of the body to permit entry of the sample into the cavity. The body is provided with means for permitting the escape of entrapped air from the cavity upon entry of the sample. In a preferred form, the material of the body will permit the passage of air and has the characteristic of causing the sample to at least begin to freeze while the body is immersed in the bath. Temperature sensing means is disposed within the cavity and supported at the closed end of the cavity by the body and means is provided for connecting the temperature sensing means to a temperature measuring circuit. Preferably, when the molten material is, for example, steel, there is means associated with the cavity for contacting the sample of the molten metal during entry or after entering the cavity to deoxidize the sample and thereby minimize voids in the sample within the cavity.

A fusible cap is provided to close the open end of the body to prevent entry of slag therein during immersion of the device to a subsurface location in the bath.

In accordance with a further aspect of the invention, there is provided a method of measuring a phase change temperature of a sample of molten material comprising the steps of immersing a device, having an open ended cavity, to a subsurface level in a bath of molten material, causing a sample of the molten material to flow into the cavity through the open end thereof, deoxidizing the molten material sample as it enters the cavity and concurrently forcing the air within the cavity through the material of the walls of the cavity, thereby permitting the cavity to be filled with deoxidized molten material, cooling the sample of molten material within the cavity to solidification temperatures below the temperature of the bath while the device is immersed therein, and initiating a measure of a phase change temperature of the sample while the device is beneath the surface of the bath. It is a further aspect of the invention to concurrently measure the temperature of the molten bath in which the device is immersed at a location outside of the cavity.

In accordance with another aspect of the invention, there is provided an immersion device for taking a sample of molten material at a subsurface level of a molten bath comprising a gas permeable body having an open ended cavity therein to receive a sample of molten material. The cavity may include a liner to provide a smoother surface to the sample and dimensional stability as between samples from other units, and a fusible cap enclosing the open end of the body.

For further objects and advantages of the invention, reference may be had to the following description taken in conjunction with the accompanying drawings, in which:

FIG. 5 is a sectional view of a modification of the invention shown in FIG. 4;

FIG. 6 is a sectional view of another modification of the invention;

FIG. 6a is a perspective view of a portion of FIG. 6; and

FIG. 7 is illustrative of an idealized chart record of a temperature cooling curve for the liquidus phase change temperature together with a bath temperature curve for a device of the type illustrated in FIG. 6.

Figure 1:
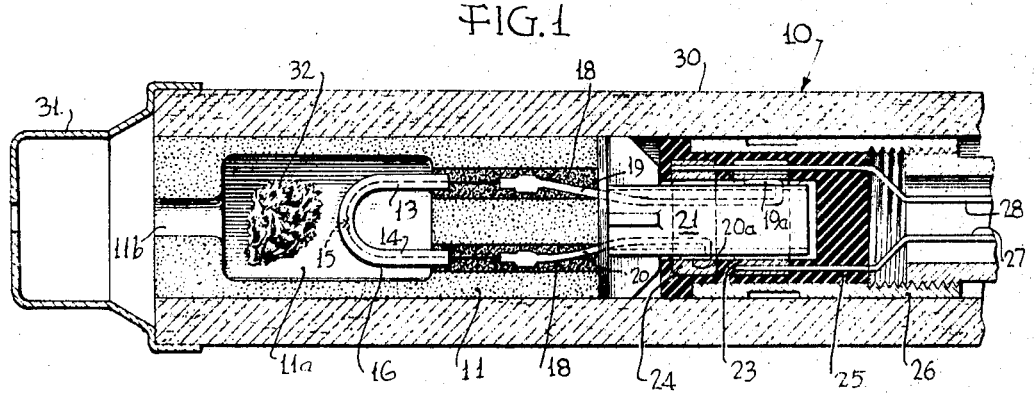
FIG. 1 is a sectional view of the immersion end of a device embodying the present invention.

Referring to FIG. 1, there is illustrated an immersion device 10 for taking a sample of molten material at a subsurface level of a bath of molten material such, for example, as steel. The device 10 includes a body 11 having a cavity 11a therein which is closed at one end and open at the other end to receive the sample of molten metal. A flow passage 11b connects the open end of the cavity 11a with the open end of the body 11 to provide a passage for entry of the sample into the cavity and prevent loss of the sample from the cavity in a manner later to be described. The cavity 11a and the flow passage 11b are conveniently circular in cross section and it will be noted that the flow passage 11b has a cross sectional area substantially smaller than the cross sectional area of the cavity 11a. The body 11 includes venting means for permitting the escape of entrapped air from the cavity 11a upon entry of the sample. The body 11 also has the characteristic of causing the molten sample in cavity 11a to cool below the temperature of the molten bath while the body 11 is immersed in the bath and the portion in the passage 11b and next to the walls of the cavity 11a to freeze, which prevents loss of molten sample from the cavity 11a.

In the preferred form of the invention, the body 11 is a molding made from resin coated sand, the molding is preferably made in two sections and in the form illustrated in FIG. 1, the sections are separated along a parting plane extending longitudinally of the device 10 with only one of the sections of the body 11 being shown. The other section is a mirror image of the section illustrated in FIG. 1. In assembly, the two sections are cemented together. The body 11 may be produced by shell molding as disclosed in copending application Ser. No. 286,312 filed June 7, 1963, issued Aug. 23, 1966 as United States Letters Patent No. 3,267,732. In shell molding, a shell mold is produced by covering a hot metal pattern or die with sand that is coated with a resin binder. The resin binder is heat setting such as a phenol-formaldehyde resin binder. The shell mold may be produced in various ways, one of which is by blowing the resin coated sand into the die cavity and the mold so formed is then capable of being hardened completely by heating. In one example, the shell was heated for approximately thirty seconds at 450° F. After baking, the sand shell is then lifted or ejected automatically from the pattern or die. The sections of the body 11 are self-supporting structures and when placed in mating relation are adapted to receive the molten metal sample. Shell moldings of this type are particularly advantageous as they are low in cost. I have discovered that the moldings have the desirable characteristic of being gas permeable so as to permit the escape of entrapped air from the cavity upon entry of the sample of molten metal and at the same time provide a heat sink which causes most of the sample to cool below the temperature of the molten bath to its solidification (freezing) temperature while the body 11 is immersed in the bath.

For further reference to the shell molding process, reference may be had to the publication "Tool and Manufacturing Engineering," vol. 46, January 1961, and the references listed therein on page 116.

At the rear or closed end of the cavity 11a is a temperature sensing means which has been illustrated in the form of a thermocouple. The thermocouple comprises thermocouple elements 13 and 14 joined together at one of their ends to form a heat-responsive or measuring junction 15. The elements 13 and 14, including the measuring junction 15, are enclosed within a thin-walled sheath 16 of heat refractory material such as fused silica, quartz or glass of high silica content. Such materials have the well known properties of being electrically-insulating, as well as heat-transmitting. The thermocouple construction, including the protective tubing 16, is desirably of the type more fully described in United States Patent No. 2,999,121. The free ends of the tube 16 are disposed in passages at the closed end of the cavity 11a, such passages being sealed with cement 18. The opposite ends of the thermocouple elements 13 and 14 are connected respectively to lead structures 19 and 20, which extend out through the rear end of the body 11 and into a hollow tubular male electrical connector 21. The connector 21 is of resilient construction and is provided with slot structure at the opposite sides thereof for receiving bent-back portions 19a and 20a of the leads 19 and 20 to form electrical contacts for the device 10. Contact structure of this type is disclosed in United States Patent No. 3,048,642 at FIG. 8. The connector 21 may be made of any suitable resilient material. In the specific embodiment illustrated in FIG. 1, the connector 21 is made from plastic of the type disclosed in Davies United States application Ser. No. 193,706, filed May 10, 1962, issued Jan. 17, 1967 as United States Letters Patent No. 3,298,874.

The lead structures 19 and 20 are adapted to connect the thermocouple or temperature sensing means to a suitable temperature measuring circuit. This may be accomplished in any suitable manner. However, in the preferred embodiment, the contacts 19a and 20a are adapted to engage the respective contact rings 23 and 24, which are supported in a female connector block 25, which in turn is mounted in the lower end of a manipulator 26, such as a length of iron pipe through which extend extension lead wires 27 and 28, respectively connected to the contact rings 23 and 24 at one of their ends and at their opposite ends to a suitable connector for connection to a temperature measuring and/or recording instrument. Such a manipulator and corresponding contact structure is likewise disclosed in the aforesaid patent No. 3,048,642.

As may be seen in FIG. 1, the body 11 is disposed in one end of a protective tube 30, preferably made from cardboard or heavy paper, as disclosed in the aforesaid Patents 2,999,121 and 3,048,642. The immersion end of the tube 30, which contains the body 11, is provided with a fusible metal cap or closure 31, which is adapted to enclose the flow passage 11b and prevent entry of slag during immersion of the device 10.

Figure 2:
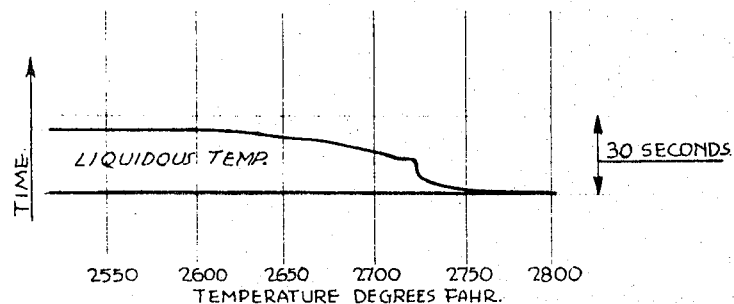
FIG. 2 is a graph of the chart record of a cooling temperature curve obtained with the device shown in FIG. 1.

In operation, the immersion end of the device 10, which includes the body 11, is immersed to a subsurface level in the molten bath of steel, below the slag level. The metal cap 31 melts within two or three seconds and allows the surrounding molten metal to enter the small flow passage 11b in the body 11. The hydraulic head of molten steel then forces a steel sample into the cavity 11a against the substantially lower pressure of the air in the cavity 11a and into contact with deoxidizing means illustrated in FIG. 1 as a piece of aluminum foil 32. The aluminum foil 32 mixes with the entering steel sample and deoxidizes it. The air in the cavity 11a is forced out through the permeable walls of the molded sand body 11 as the cavity 11a is filled with deoxidized molten steel. The hot junction 15 of the thermocouple, including elements 13 and 14, responds to the temperature of the steel sample within the cavity 11a and by reason of the heat sink, provided by the walls of the body 11, the sample cools with the thermocouple recording the changing temperature of the cooling steel sample, as shown by the curve in FIG. 2. As will be seen from FIG. 2, the maximum temperature recorded for the steel sample in the cavity 11a was 2800° F. The steel sample cooled and started into its liquidus temperature of 2722° F. in approximately ten seconds. It remained constant, at this temperature, for the next ten seconds. The recorded temperature decreased abruptly around the time that the device 10 was pulled up and out of the molten steel bath. The liquidus temperature that is obtained can be correlated to the carbon composition of the steel in a manner well known in the art. Such correlation is similar to the correlation of the liquidus temperatures obtained from cooling curves of gray iron in the determination of the carbon equivalent of various iron samples. For example, a series of steels are produced, having various known carbon compositions and their liquidus temperatures measured. From this data, it is only necessary to determine the liquidus temperature of a new batch of steel and such temperature can be accurately correlated from the previous data to the carbon composition of the new batch of steel. This correlation is known to be true as long as the effects of other alloys are taken into account.

When the device 10 is removed from the bath, the sample within the passage 11b will have solidified, as well as a portion adjacent the walls of the cavity 11a. All of the sample will be solidified within a short time after removal of the device from the bath. A portion of the solidified steel sample can be used to determine the oxygen and hydrogen contents of the steel and it may also be used in conjunction with a spectrograph to determine the presence or concentration of minor metallic constituents in the steel. The body may be modified as to its shape to provide solidified samples or sample portions of any desired configuration.

Figure 3:
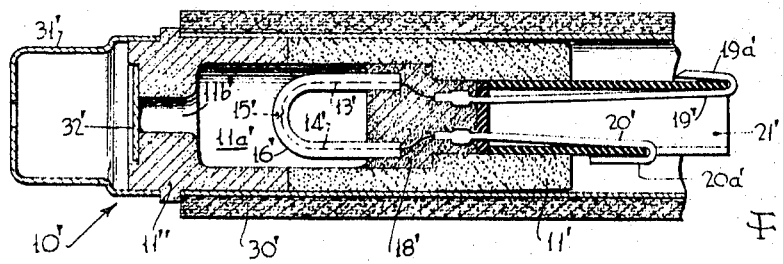
FIG. 3 is a sectional view of a modification of the invention.

Referring to FIG. 3, there is shown a modification of the embodiment illustrated in FIG. 1. For the sake of simplicity, the parts in FIG. 3 which correspond to parts previously described in connection with FIG. 1 have been provided with the same reference characters but with the addition of a prime. In the device 10' in FIG. 3, the body is comprised of two cylindrical sections 11' and 11" having a parting plane substantially perpendicular to the longitudinal axis of the body and passing through the cavity 11a'. The body section 11" contains the flow passage 11b' while the body section 11' supports the temperature sensing means including the thermocouple elements 13', 14', the hot junction 15' and the protective refractory tube 16'. The free ends of the tube 16' are supported in moisture free cement 18' or other suitable material and the free ends of the thermocouple elements 13' and 14' are respectively connected to the corresponding lead structures 19' and 20', which, respectively, are provided with contact portions 19a' and 20a'. The contacts 19a' and 20a' of the male connector portion 21', which may be a vulcanized fibre tube with notches to receive the bent-back wires, are adapted to cooperate with a female contact block and ring structures, such as illustrated in FIG. 1.

In the modification illustrated in FIG. 3, the deoxidizing means 32' comprises an aluminum strip which is adapted to cover the entrance to the passage 11b' which discharges into the cavity 11a'. The metal cap 31' is made of steel and protects the aluminum strip 32' during insertion of the device 10' through the layer of slag which may exist on the molten steel bath. The operation of the immersion device 10' illustrated in FIG. 3 is the same as that previously described for device 10 in connection with FIGS. 1 and 2. The tube 30' may be cardboard or as illustrated in FIG. 3 it may be a thin metal tube wrapped with ceramic impregnated asbestos fibre.

Figure 4:
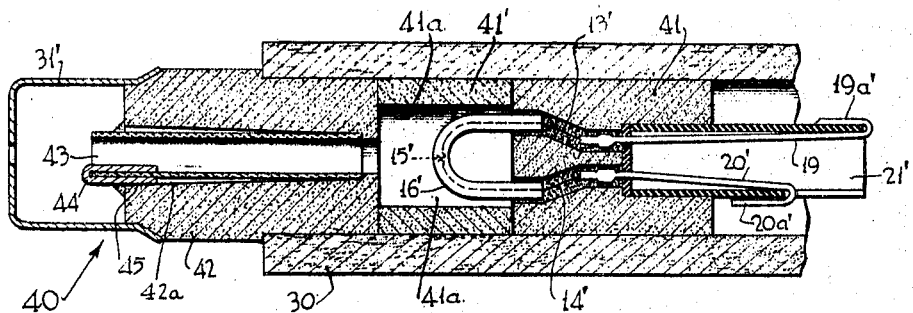
FIG. 4 is a sectional view of a further modification of the invention.

Referring to FIG. 4, there is shown an immersion device 40 which is a further modification of the invention. The device 40 is similar in many respects to device 10' illustrated in FIG. 3 and corresponding parts have been provided with corresponding reference characters. The device 40 is provided with a body comprised of three sections, 41, 41' and 42, having parting planes substantially perpendicular to the longitudinal axis of the body and passing through the ends of cavity 41a. The body section 42 is provided with a flow passage 42a which communicates with cavity 41a and is of substantially smaller diameter. The body sections 41, 41' and 42 are preferably permeable sand moldings of the type previously described. The flow passage 42a is provided with a liner such as quartz or Vycor tube 43 to provide the sample of steel which solidifies therein with a smooth exterior surface so that it will be in a form suitable for chemical analysis. The outer end of the tube 43 is provided with an aluminum wire 44, which is held in place at 45.

In operation, the device 40 is immersed into the molten steel bath to a level below the slag, at which a representative sample is desired. The steel cap 31' prevents slag from entering the tube 43 by remaining intact until this portion of the device has been immersed below the slag level. The steel cap 31' then melts off. The molten steel begins to enter the tube 43 and while doing so it comes into contact with a section of the aluminum wire or strip 44. The aluminum serves to deoxidize the steel in the manner previously described so that no void-producing gases are formed during solidification. The molten steel passes through the tube 43 into the cavity 41a and the thermocouple comprising the thermocouple elements 13' and 14' joined at 15' to form a hot junction, responds to the temperature of the cooling steel in the manner previously described in connection with FIG. 1 and illustrated in FIG. 2. The molten steel first solidifies within the tube 43 in only a few seconds. When the device 40 is removed from the molten steel and the sample allowed to completely solidify, the steel sample may then be extracted from the body. As may be seen in FIG. 4, the tube 43 extends beyond the outer end of the sand molding 42. This minimizes the possibility of molten metal which has reacted with any of the organic materials, making up the device 40, entering the tube 43. Such contaminated metal might yield a false chemical analysis. The construction of the body section 42 permits the solidified sample to be conveniently removed. The sand molding 42 loses its strength as its binder is burned off by the heat of the molten metal. After the molten metal sampler device 40 is removed from the bath of molten steel, the solidified steel sample may be knocked from its housing 42 by a light blow. The quartz tube 43 can then be broken off with a hammer or other suitable device. If the cap 31' is made from aluminum, the aluminum strip 44 may be eliminated, thus permitting the aluminum cap to serve two purposes, namely, prevent entry into the tube 43 of slag during immersion and subsequently serving to deoxidize the sample of molten steel as the hot steel melts the cap.

Referring to FIG. 5, there is shown a further modification of a molten material sampler which is similar to the section 42 of the device 40 previously described and illustrated in connection with FIG. 4. In the device illustrated in FIG. 5, the body 42' differs from the body section 42 illustrated in FIG. 4 by reason of the fact that the flow passage 42a which may receive a quartz tube 43 or the walls thereof may be coated with a smooth refractory cement, does not extend entirely through the body section 42' but instead, terminates in the section 42' to form a cavity. The same refractory cement coating may be used in the flow passages and cavities in the other embodiments. The body 42' in FIG. 5 is supported at the outer end of a cardboard or tube of inert material 30, which in turn is supported by a length of pipe 46 which extends into the tube 30. The pipe 46 preferably is provided with retaining means, such as a projection 46a for retaining the tube 30 thereon. Thus it will be seen from FIG. 5 that the device illustrated therein is adapted solely to extract a solid sample of material in a form suitable for analysis from a container of molten material.

Referring to FIG. 6, there is illustrated a further embodiment of the invention which is particularly suited for obtaining the temperature of the molten bath of material, as well as measuring the liquidus temperature of the sample of the molten material and obtaining a solid sample of material in a form suitable for chemical analysis. In FIG. 6, the immersion device 50 includes a body 51 illustrated as comprising a pair of sections having a parting plane extending along the longitudinal axis of the body in a manner similar to that described in connection with FIG. 1. The body 51 preferably is a shell molded sand housing, as previously described, and includes a cylindrical cavity 51a which connects with a flow passage 51b, which connects with the open end of the body 51 to permit entry of the molten metal sample into the cavity 51a. A temperature sensing means in the form of a thermocouple is disposed within the cavity 51a. The temperature sensing means in cavity 51a is similar to that described and illustrated in connection with FIG. 1 and the corresponding parts have been provided with corresponding reference characters. Thus it will be seen that the thermocouple elements 13 and 14 are joined together at one of their ends to form a measuring junction 15 and the major portions of the thermocouple elements 13 and 14, as well as the measuring junction 15, are contained within a refractory protected tube, such as a quartz tube 16. The thermocouple elements 13 and 14 are connected at their opposite ends, respectively, to lead structures 19 and 20, the outer ends of which are supported by a male connector element 52 and are provided with contact portions 19a and 20a. While these contact portions may normally be positioned on opposite sides of the tube 52, they have been shown on the same side thereof for purposes of clarity. The tube 52 may be of any suitable resilient electrically insulated material and preferably, is made of a vulcanized fibre. The tube 52 is supported at one end within the adjacent or rear end of the body 51.

The flow passage 51b may be provided with a tubular liner 54, which can be a coating of refractory cement, or a quartz or Vycor tube. Projecting from the open end of the body 51 is a second temperature measuring means which is of similar construction to the thermocouple disposed within the cavity 51a. The second temperature sensing means comprises a pair of thermocouple elements 55 and 56, joined together at one of their ends to provide a measuring junction 57 which is disposed within a refractory protective tube 58 of quartz or Vycor. The free ends of the tube 58 are supported and sealed within the end of the body 51 by means of cement 59.

The metal cap 31' protects the U-tube 58 during immersion through the slag and also prevents slag from entering the flow passage 51b. The outer end of flow passage 51b is covered by an aluminum strip 32" which functions in a manner similar to strip 32' previously described in connection with FIG. 3. The member 32" is more clearly shown in FIG. 6a and is of circular configuration, having a pair of slots 32a" therein which are adapted to extend around the spaced legs of the U-tube 58. The member 32" is adapted to be held in position over the open end of flow passage 51b by suitable cement. When the device 50 is immersed in the molten metal bath, the aluminum member 32' melts and deoxidizes the sample of molten metal entering the flow passage 51b leading to cavity 51a in the body 51.

The opposite ends of the thermocouple elements 55 and 56 are connected respectively to lead structures 61 and 62, which extend through the body 51 to the rear end thereof and are provided with contact portions 61a and 62a, which in turn are supported by the male connector element 52. The contacts 19a and 20a are adapted to engage ring contacts 63 and 64, which in turn are carried by a female connector block 65 of electrical insulating material. The ring contacts 63 and 64 are respectively connected to lead wire extensions 67 and 68, which are adapted to connect with a temperature measuring circuit. Similarly, the contacts 61a and 62a on the male connector 52, are adapted to engage the ring contacts 69 and 70 of the female contact block 65. The ring contacts 69 and 70 are respectively connected to lead wire extensions 71 and 72, which in turn are adapted to connect with a temperature measuring circuit. While the lead wires 67, 68 may be connected to a temperature measuring circuit in one recorder and the lead wires 71 and 72 connected to a temperature measuring circuit in a second recorder, it is preferable that such lead wires connect to temperature measuring circuits contained in a single recorder of the multi-point or two pen types well known in the recorder art. In this manner, the thermocouple including the measuring junction 57 will be effective to record on a chart the temperature of the molten bath and the thermocouple including the temperature measuring junction 15 within the cavity 51a will be effective to record on the same chart the cooling curve for the sample of molten material. Thus the liquidus phase change temperature of the sample of molten material and the temperature of the bath of molten material outside of the body 51 will be recorded concurrently on a common chart. Such concurrent temperature recording would be of the general type shown in the sample chart record illustrated in FIG. 7.

It should be understood that the invention is not limited to the specific arrangements shown herein and that changes and modifications may be made therein.

What is claimed is:

1. An immersion sampler device for taking a sample of a molten material at a subsurface level of a bath of molten material comprising:
a body having a cavity therein closed at one end and open at the other end to reecive the sample of molten material,
a flow passage connecting the open end of said cavity with the exterior of said body to permit entry of the sample into said cavity,
said flow passage having a cross sectional area substantially smaller than the cross sectional area of said cavity,
said body having means for permitting the escape of entrapped air from said cavity upon entry of the sample,
said body having the characteristics of causing the sample to cool to a temperature below the temperature of the molten bath while said body is immersed in the bath,
temperature sensing means disposed within said cavity and supported at the closed end of said cavity by said body, and
means for connecting said temperature sensing means to a temperature measuring circuit.

2. An immersion sampler device according to claim 1 including means associated with said cavity for contacting the sample of molten material entering said cavity to deoxidize the sample and thereby minimize voids in the sample within said cavity.

3. An immersion sampler device according to claim 2 wherein said deoxidizing means is disposed within said cavity.

4. An immersion sampler device according to claim 2 wherein said deoxidizing means is disposed at the entrance to said cavity.

5. An immersion sampler device according to claim 1 including a fusible cap enclosing the open end of said cavity.

6. An immersion sampler device according to claim 5 wherein said fusible cap is constructed of a material having deoxidizing properties when fused in said bath.

7. An immersion sampler device according to claim 1 wherein said body comprises a pair of sections having a parting plane extending along the longitudinal axis of said body.

8. An immersion sampler device according to claim 1 wherein said body comprises two sections having a parting plane substantially perpendicular to the longitudinal axis of said body and passing through said cavity.

9. An immersion sampler device according to claim 1 wherein said flow passage is provided with smooth surface liner.

10. An immersion sampler device according to claim 1 including a second temperature sensing means supported by said body and projecting from said body, and means extending through said body and spaced from said cavity for connecting said second temperature sensing means to a temperature measuring circuit.

11. The method of measuring the liquidus phase change temperature of a sample of molten metal comprising:
immersing an open ended cavity to a subsurface level in a bath of molten metal,
causing a sample of the molten metal to flow into the cavity through the open end thereof,
deoxidizing the molten metal sample as it enters the cavity and concurrently forcing the air within the cavity through the walls of the cavity thereby permitting the cavity to be filled with deoxidized molten metal,
cooling the sample of molten metal within the cavity to solidification temperatures below the temperature of the bath while the cavity is immersed therein, and
initiating a measure of the liquidus phase change temperature of the sample while the cavity is beneath the surface of the bath.

12. A method according to claim 11 including the step of concurrently measuring the temperature of the molten metal bath outside of the cavity.

13. An immersion device according to claim 1 wherein said body is constructed of a material which is gas permeable.

14. An immersion sampler device for taking a sample of molten material at a subsurface level of a molten bath comprising a body having an open ended cavity therein to receive a sample of molten material, said body being constructed of porous material permeable to gas, and a fusible cap enclosing said open end of said cavity.

15. An immersion sampler device according to claim 14 including temperature sensing means disposed within said cavity and supported by said body.

16. An immersion sampler device according to claim 15 including a second temperature sensing means supported by said body and projecting therefrom at said open end of said cavity and within said fusible cap.

17. An immersion sampler device for measuring the temperature of a sample of molten material at a subsurface level of a molten bath as said sample cools through its phase change comprising:
    an immersible body having walls defining a cavity to receive and retain a molten sample of material when immersed in a molten bath, said walls providing a heat sink to cool said sample in a manner permitting recording the changing temperature of the cooling sample to produce a curve showing a phase change temperature,
    a passage through one of said walls for entry of said molten sample into said cavity, said passage having a cross sectional area smaller than the cross sectional area of said cavity to prevent loss of said molten sample from said cavity through said passage during cooling thereof,
    a fusible closure for said passage permitting entry of said molten sample into said cavity upon destruction of said fusible closure,
    temperature sensing means carried by said body and extending to within said cavity for sensing the changing temperature of the molten material within said cavity during cooling of said molten sample while said body is immersed in said molten bath, and
    means to connect said temperature sensing means to the measuring circuit of a temperature recorder.

18. An immersion sampler device according to claim 17 including a second temperature sensing means supported by said body and projecting outwardly therefrom.

19. An immersion sampler device according to claim 18 including a fusible cap enclosing said second temperature sensing means.

20. An immersion sampler device according to claim 18 wherein said fusible closure is a fusible cap enclosing both said second temperature sensing means and said passage to said cavity.

21. An immersion sampler device according to claim 14 including a temperature sensing means supported by said body and projecting outwardly from the exterior face of said body.

22. An immersion sampler device for taking a sample of molten material at a subsurface level of a molten bath comprising:
    a body having a cavity therein to receive a sample of molten material,
    an opening into said cavity permitting passage of molten material into said cavity when said body is immersed in a molten material, said body being constructed of porous material permeable to gas,
    and a fusible closure covering said opening prior to immersion of said body into the molten bath.

23. An immersion sampler device according to claim 22 including temperature sensing means disposed within said cavity and supported by said body.

24. An immersion sampler device according to claim 23 including a second temperature sensing means supported by said body and projecting outwardly therefrom and a fusible cap enclosing said second temperature sensing means.

References Cited

UNITED STATES PATENTS

| | | | |
|---|---|---|---|
| 3,221,559 | 12/1965 | Miller | 73—421 |
| 2,485,492 | 10/1949 | Hubbard et al. | 73—425.4 |
| 3,267,732 | 8/1966 | Hance | 73—359 |
| 3,298,069 | 1/1967 | Acre | 73—425.4 |
| 3,321,973 | 5/1967 | Anderson | 73—359 |
| 3,357,250 | 12/1967 | Lowdermilk | 73—354 |

LOUIS R. PRINCE, Primary Examiner

DENNIS E. CORR, Assistant Examiner

U.S. Cl. X.R.

73—359, 425.4